United States Patent
Lin et al.

(10) Patent No.: US 10,509,882 B2
(45) Date of Patent: Dec. 17, 2019

(54) SYSTEMS AND METHODS FOR CELL ABUTMENT

(71) Applicant: Taiwan Semiconductor Manufacturing, Co., Ltd., Hsinchu (TW)

(72) Inventors: Wan-Ru Lin, Taipei (TW); Ching-Shun Yang, Zhudong Township (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 503 days.

(21) Appl. No.: 15/334,918

(22) Filed: Oct. 26, 2016

(65) Prior Publication Data

US 2018/0046744 A1 Feb. 15, 2018

Related U.S. Application Data

(60) Provisional application No. 62/372,623, filed on Aug. 9, 2016.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01); *G06F 2217/12* (2013.01); *Y02P 90/265* (2015.11)

(58) Field of Classification Search
USPC ........................................................ 716/122
See application file for complete search history.

(56) References Cited

U.S. PATENT DOCUMENTS

| | | |
|---|---|---|
| 8,601,416 B2 | 12/2013 | Kuo et al. |
| 8,762,900 B2 | 6/2014 | Shin et al. |
| 8,775,993 B2 | 7/2014 | Huang et al. |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 2012/0241986 A1* | 9/2012 | Sherlekar ............ H01L 27/0207 257/784 |
| 2014/0237435 A1 | 8/2014 | Chen et al. |

(Continued)

*Primary Examiner* — Bryce M Aisaka
(74) *Attorney, Agent, or Firm* — Sterne, Kessler, Goldstein & Fox P.L.L.C.

(57) ABSTRACT

The present disclosure is directed to systems and methods for cell placement. In embodiments, the methods include placing a plurality of cells selected from a cell library in a chip design to produce a first cell placement and determining whether the first cell placement satisfies design demands. In further embodiments, the method also includes rearranging a first cell to abut the first cell with a second cell when the first cell placement fails to satisfy design demands. In still further embodiments, the first cell is rearranged until a second cell placement providing a minimum metal route between the first and second cells is determined. In various embodiments, the method further includes generating a design layout based on the second cell placement and outputting the design layout to a machine readable storage medium. The outputted layout is used to manufacture a set of masks used in chip fabrication processes.

20 Claims, 5 Drawing Sheets

(56) References Cited

U.S. PATENT DOCUMENTS

| | | |
|---|---|---|
| 2014/0304670 A1 | 10/2014 | Su et al. |
| 2015/0278419 A1 | 10/2015 | Yang et al. |
| 2015/0370937 A1 | 12/2015 | Liu et al. |
| 2015/0370945 A1 | 12/2015 | Lee |
| 2017/0344686 A1* | 11/2017 | Chang ................. G06F 17/5072 |

* cited by examiner

SYSTEMS AND METHODS FOR CELL ABUTMENT

BACKGROUND

The semiconductor industry has experienced continual rapid growth due to continuous improvements in the integration density of various electronic components (i.e., transistors, diodes, resistors, capacitors, etc.). For the most part, this improvement in integration density has come from repeated reductions in minimum feature size, allowing for the integration of more components in a given area.

For integrated circuit designs, process design kits (PDKs) have been commercially used to design the integrated circuits. Conventionally, a PDK is a set of data files and script files used within the semiconductor industry to model transistors of a certain technology for a certain foundry. Different kinds of cell libraries can be used with various available software tools. A PDK's main components are models, symbols, technology files, cells, and rule files. With a PDK, designers can work through the design process seamlessly, from schematic entry to tapeout. For example, circuit design engineers can use the information in PDKs to prepare netlists for circuit simulations, and based on the simulation results, these engineers can validate and/or modify the designs of the integrated circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
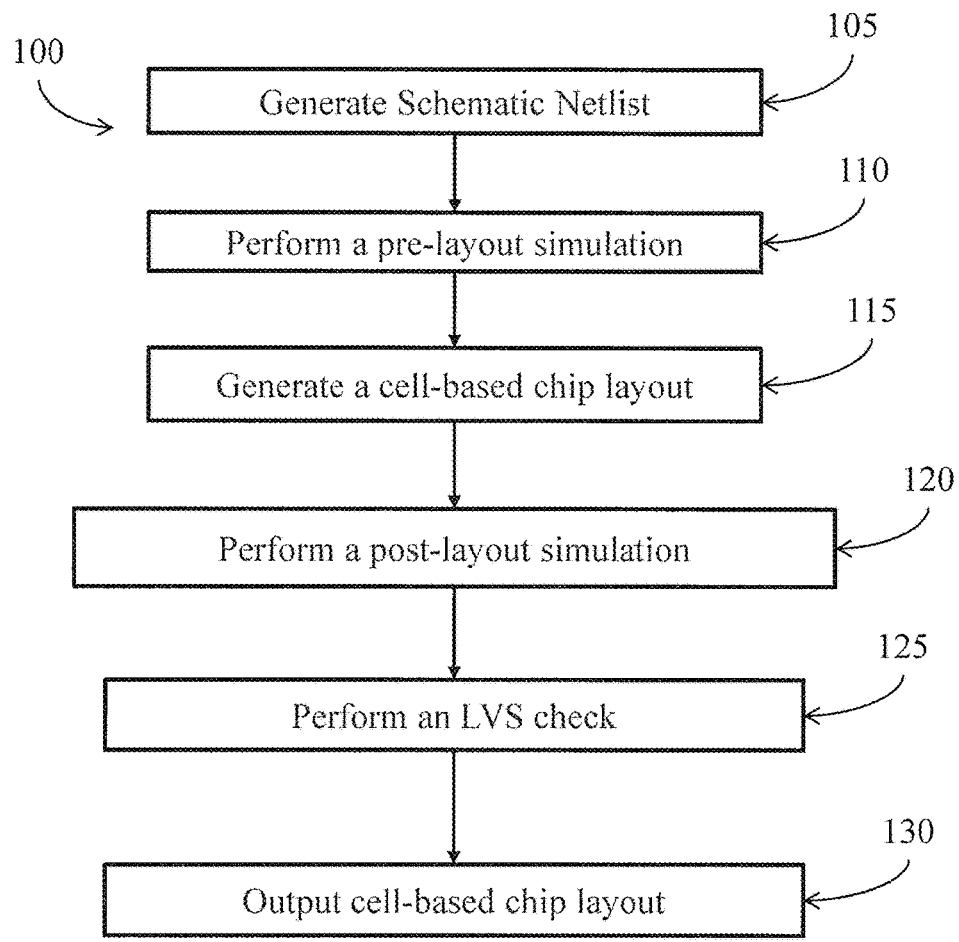
FIG. 1A is a flow diagram of an exemplary process for generating a cell-based chip layout including a cell abutment process.

The following disclosure provides many different embodiments, or examples, for implementing different features of the provided subject matter. Specific examples of components and arrangements are described below to illustrate and explain the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

FIG. 1A is a flow diagram illustrating an exemplary process for generating a cell-based chip layout including a cell abutment process. This disclosure provides a computer-implemented method for performing a cell abutment process as part of generating a cell-based chip layout. Aspects of generating a cell-based chip layout including a cell abutment process include providing a library of different types of cells. During a cell-based chip design, a plurality of cells are selected from a cell library and placed, typically in rows, to partially form the chip layout. After placement, a routing operation is performed in which interconnections in the chip layout between various placed cells. Together, these operations are referred to as place-and-route. Those skilled in the art will recognize that the placed cells can be rearranged, e.g., rotated, flipped (horizontally or vertically), mirrored (horizontally or vertically), etc., through repeated iterations of the place-and-route operations. Performing additional place-and-route operations is typically done in order to produce a chip layout from which a chip that meets design specifications can be successfully manufactured.

As design rules, constraints, and limitations become increasingly complex with the advancement of technologies, electronic design automation (EDA) tools are not able to optimize cell placements in the chip layout. Embodiments in accordance with this disclosure can be used to reduce layout effort, e.g., a layout can be generated with clean a DRC result thereby reducing layout effort for engineers, and to meet variant layout style with a built-in interface to overcome this technological challenge, e.g., users have multiple layout styles with a clean DRC result. Thus, according to aspects of this disclosure, the techniques described herein can be used to meet complex requirements of one dimensional (1D)-routing, increase simulation performance and to provide improved layout results. For example, abutted devices can be placed in the layout first before all devices are placed in the layout such that users could have more accurate simulation result.

In various embodiments, the chip can be a digital chip, an analog chip, a mixed-signal chip, a field-programmable gate array chip, or any other type of chip.

Referring to FIG. 1A, one exemplary method 100 includes generating a netlist representing a desired circuit by using the PDK file at operation 105. The netlist can be generated from a schematic that is entered into a schematic capture system. The netlist can also be generated from a hardware description language (HDL) model, e.g., Verilog and VHDL, of the desired circuit. In some embodiments, the PDK file includes a plurality of device models that are assigned to a respective plurality of devices, subcircuits, or cells. For example, the devices can include an n-channel metal-oxide-semiconductor field effect transistor (MOSFET), a p-channel MOSFET, a p/n junction diode, a resistor, a capacitor, an inductor, a bipolar transistor, a high-voltage (HV) device, and/or other semiconductor devices or electrical components.

In some embodiments, the netlist is generated on a platform, such as VIRTUOSO®, which is commercially available from CADENCE DESIGN SYSTEMS, Inc. (San Jose, Calif.). For example, the PDK file can be used to generate a netlist for the pre-layout simulation. In some embodiments the pre-layout simulation is a static timing analysis. In some embodiments, the netlist can be referred to as, for example, a transistor netlist or a gate-level netlist. In some embodiments, generating the netlist includes performing schematic entry. In alternative embodiments, generating the netlist includes synthesizing a logic circuit design.

Method 100 also includes designing a cell-based chip by performing a pre-layout simulation using the netlist at operation 110. In some embodiments, pre-layout simulation 110 is performed on a circuit simulator, e.g., HSPICE® from SYNOPSYS, Inc. (San Jose, Calif.), SPECTRE® from CADENCE DESIGN SYSTEMS, Inc. (San Jose, Calif.), or any suitable circuit simulator. Circuit simulations are typically performed during the course of designing cells for a library of cells (i.e., a cell library). Once characterized cells are available, a timing analysis can be performed in addition to, or in place of a circuit simulation. In embodiments, the pre-layout simulation can be based on estimates of the circuit's parasitic loading. The pre-layout simulation can be performed using the netlist file that is generated at operation 105. In some embodiments, for a cell-based digital chip design, pre-layout simulation 110 can be a timing simulation.

After pre-layout simulation 110, exemplary method 100 includes generating a chip layout at operation 115. For example, in some embodiments, the chip layout may be generated as a Graphic Database System (GDS) file (e.g., a GDSII stream format file). According to aspects of this disclosure, the generated chip layout can correspond to the simulation result of the pre-layout simulation. For example, if the pre-layout simulation passes the behavior check and/or the function check, as described herein, the design rules can be used to generate the chip layout.

Figure 1B:
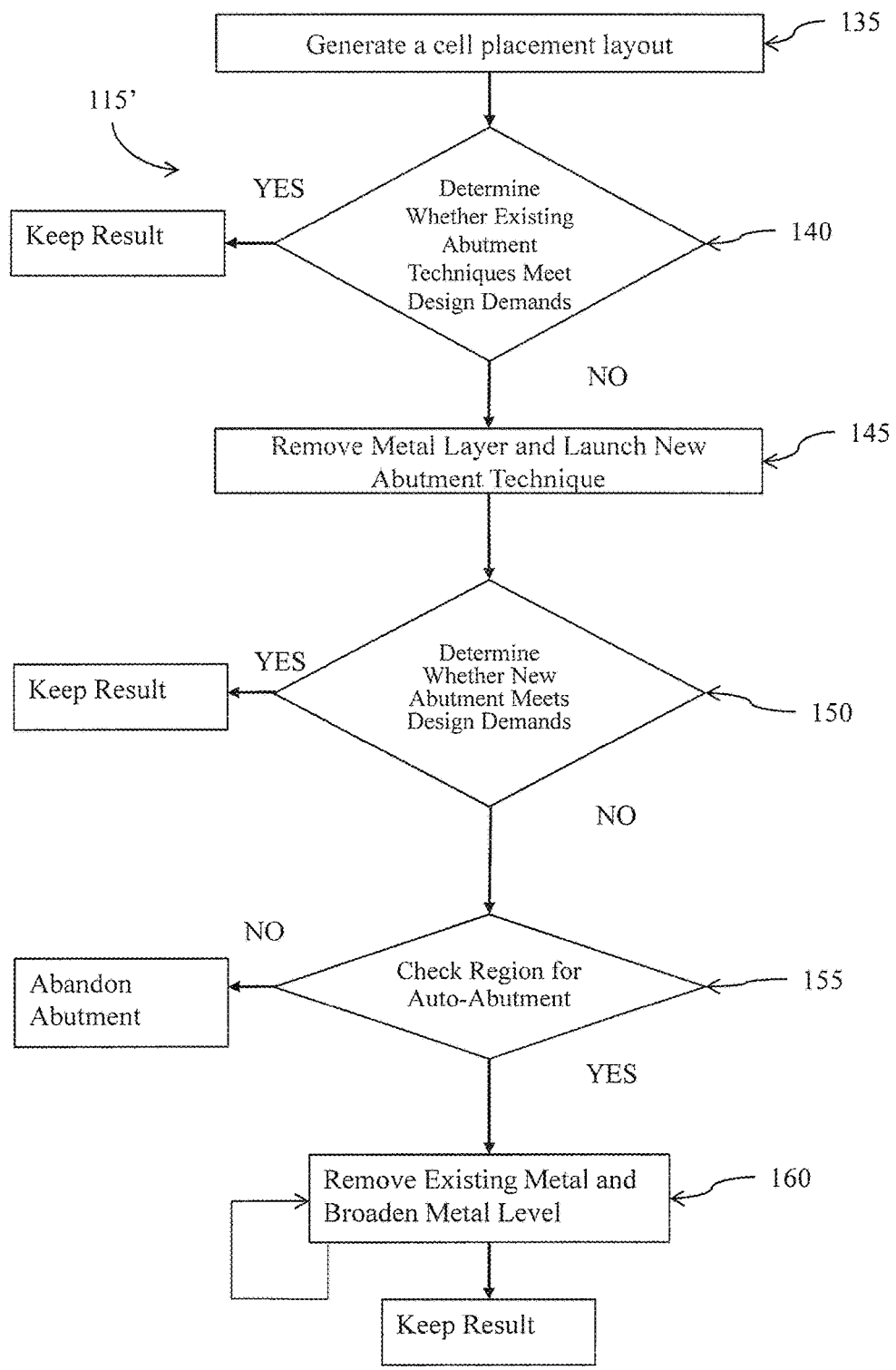
FIG. 1B is a flow diagram of an exemplary process for generating a cell-based chip layout.

Generating the chip layout 115 can be performed using an exemplary method 115' as shown in FIG. 1B. Method 115' includes generating a cell placement layout at operation 135. In various embodiments, generating cell placement layout 135 includes selecting a plurality of cells from the cell library and placing the selected cells in the chip layout. Once selected and placed in the chip layout, method 115' further includes determining whether existing abutment techniques meet design demands at operation 140, e.g., determining whether the existing abutment techniques provide a correct metal routing between cells and/or between layers. For example, the existing abutment techniques may fail to meet design demands when the cell placement layout does not provide an optimal result, such as when the metal placement is incomplete, when a minimum pitch is not satisfied, or when a multiple patterning requirement is not satisfied. In some embodiments, design demands can include criteria established by a designer to meet optimized layouts, i.e., to generate a clean DRC result. Additionally, for a correct metal routing, a layout meets all design demands for chip tape-out.

When the determination at operation 140 indicates that the existing abutment techniques meet design demands, the chip layout is kept and method 115' ends. In contrast, when the determination at operation 140 indicates that the existing abutment techniques does not meet design demands, method 115' includes removing a metal layer and launching a new abutment at operation 145. This operation includes removing any metal from a first wiring layer and rearranging the previously generated cell placement layout 135. The plurality of cells can be rearranged, e.g., rotated, flipped (horizontally or vertically), mirrored (horizontally or vertically), or any other known technique may be applied to change the orientation of the cells, until the arrangement of an optimal cell placement is determined, e.g., a cell placement providing a minimum metal route between the abutted cells.

Figure 2:
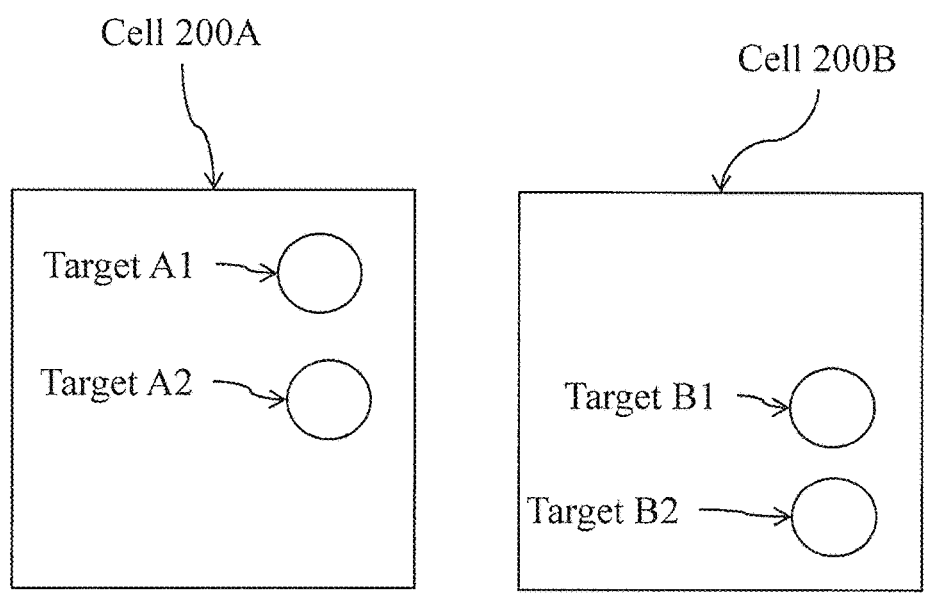
FIG. 2 illustrates cells having exemplary connection targets.

In some embodiments, a connection target of each cell can be located at a position spaced away from a cell boundary, and the cells can be rearranged, as described above, to minimize a wire length between the connection targets. For example, as illustrated in FIG. 2, a first cell 200A includes a first connection target A1 and a second connection target A2 and a second cell 200B includes a third connection target B1 and a fourth connection target B2. In various embodiments, first cell 200A (or second cell 200B) can be rearranged to minimize a wire length between the first connection target A1 and the third connection target B1, or alternatively, to minimize a wire length between the second connection target A2 and the fourth connection target B2).

Method 115' also includes determining whether the new abutment meets design demands at operation 150, e.g., determining whether the new abutment generated at operation 145 provides a correct metal routing between cells and/or between layers. When the determination at operation 150 indicates that the new abutment technique meets design demands, the chip layout is kept and method 115' ends. In contrast, when the determination at operation 150 indicates that the new abutment techniques does not meet design demands, method 115' includes checking a placement region to determine whether an auto-abutment technique can be performed at operation 155. For example, such determination can include determining whether the region includes sufficient space between cells for metal routing. When the auto-abutment cannot be performed, method 115' terminates by abandoning the abutment and discarding the chip layout. When the auto-abutment can be performed, method 115' further includes removing existing metal layers and broadening metal usage on each layer at operation 160. Removing existing metal and broadening metal level 160 may include extending a metal spacing, flipping a pattern order, e.g., a pattern color, and broadening a metal level for a multi-netlist layout. During removing existing metal and broadening metal level 160 an original metal routing can be removed and abutment techniques can be repeated. In some embodiments, removing the original metal layer provides more metal routing level(s) to work with. In some embodiments, a broader layer of metal routing can be added to a fabrication layer. In various embodiments, the result of removing existing metal and broadening metal level 160 may be kept when the cell layout provides a complete metal placement that meets minimum pitch requirements and meets multiple patterning requirements. Additionally, the result may be kept when the cell layout passes a physical verification such as a clean DRC result or clean layout versus schematic (LVS) result. Alternatively, in some embodiments, removing existing metal and broadening metal level 160 can be performed iteratively for any number of metal layers until a cell placement layout provides acceptable results as discussed herein. In this way, the cell layout generated based on the processes described herein can be used to generate a tape-out, i.e., a completed design result, for manufacture.

Various embodiments in accordance with this disclosure can be used to place the cells based on the abutment type to abut a device chain with the metal routing. In some embodiments, a device chain is a chain of each device that will be abutted and be arranged in a row. The device chain can used to save layout space thereby gaining more area. Additionally, the cell abutment techniques described herein can be performed for a cell-to-cell routing. For example, these techniques can be performed for both rows of cells and columns of cells. According to further aspects of this disclosure, the cell abutment techniques can be used in multiple patterning implementations, e.g., double and triple patterning. For example, in implementations that take multiple patterning requirements into account, the cell abutment techniques of this disclosure can be used to minimize the wire length while maintaining an optimal cell layout— where optimal means optimized for a given set of constraints and not necessarily globally optimized. According to aspects of this disclosure, the cell abutment techniques advantageously avoid complex condition judgment in coding, and enhances abutment layout style. This cell abutment also provides more flexibility for routing layout style.

The methods of this disclosure can be used to determine an optimal cell placement and abutment arrangement for the chip layout to create a composite metal structure of the required topology. In various embodiments, this process can be used in middle-end and back-end layers of the chip. Additionally, the cell abutment techniques can be used with any number of metal layers. In some embodiments, a user can customize the number of metal layers used in the layout or the number of metal layers may be dynamically determined to complete the routing with an optimal chip layout. Once the optimal cell placement and abutment arrangement has been determined, design rules can be applied to route the metal layers between the cells.

In embodiments, the design rules can also include various dimensional parameters, device models, terminals, and/or other electrical parameters. Using these rules, this disclosure can be used to implement a metal route based on a global view for minimizing the metal route. In further embodiments, performing the pre-layout simulation can use the design rules associated with a specific technology node, as described above.

The pre-layout simulation result can include electrical and/or functional characteristics that are subjected to a behavior check and/or a functional check. For example, the behavior check can include checking if electrical characteristics of the chip satisfy predetermined criteria for an electrical characteristic. Additionally, the functional check can, for example, include checking if the voltage state of input nodes and/or output nodes of the integrated circuit meets a predetermined functional specification. Once the pre-layout simulation result satisfies either or both of these checks, process 100 can proceed to layout the chip.

Method 100 can include performing a post-layout simulation at operation 120. In various embodiments, performing post-layout simulation 120 is performed on a post-layout simulator. In some embodiments, the post-layout simulation can be performed using the same simulator as utilized to perform the pre-layout simulation. In some embodiments, post-layout simulation can be based on parasitic loading extracted from the layout. Method 100 can include performing a layout versus schematic (LVS) check at operation 125. In some embodiments, performing the LVS check includes extracting a layout netlist of the IC from the design layout and comparing the layout netlist and the netlist that is generated by operation 105. In embodiments, if the information of the netlist matches that of the layout netlist, the LVS check is clean. Alternatively, if the node information of the netlist does not match that of the layout netlist, LVS would be failed, and the cell-based chip layout can be checked and/or modified. Method 100 further includes outputting the layout to a machine readable storage medium, wherein the outputted layout is used to manufacture a set of masks used in the photolithography operations of integrated circuit fabrication at operation 130. In embodiments, outputting the layout can be performed when the LVS check is clean.

Figure 3:
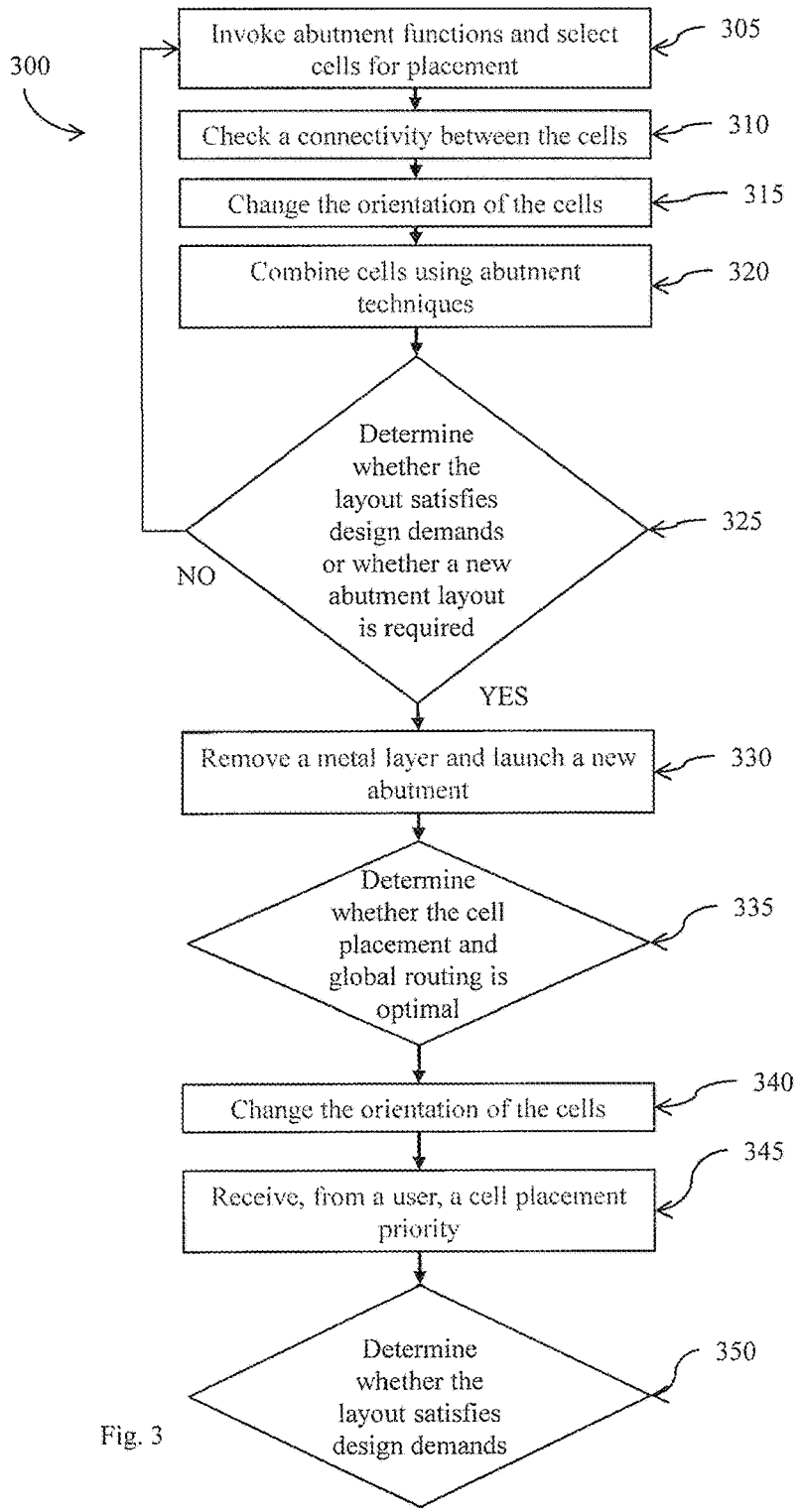
FIG. 3 is a flow diagram of an exemplary process for generating a cell-based chip layout including a cell abutment process.

FIG. 3 is a flow diagram of an exemplary process for generating a cell-based chip layout including a cell abutment process. A method 300 includes invoking abutment functions and selecting cells for placement 305, and checking a connectivity between the cells, e.g., a wire-length, between the selected cells 310. Method 300 also includes changing the orientation of the cells to integrate connectivity between the cells effectively 315.

In some embodiments, method 300 includes combining cells using abutment techniques (e.g., conventional technique of determining whether a cell can be placed in a layout based on the cell width/length) 320. In turn, method 300 further includes determining, by a user, whether the layout satisfies design demands or whether a new abutment layout is required 325. For example, a user can select whether to repeat operations 305-325 or to trigger the abutment processes described herein.

When the user opts to perform a new abutment layout, method 300 includes removing a metal layer and launching a new abutment at operation 330. This operation includes removing any metal from a first wiring layer and rearranging the previously generated cell placement layout.

Method 300 further includes analyzing the cell placement to determine whether a cell placement and global routing is optimal 335. When the cell placement and global routing is not optimal, method 300 includes rearranging the plurality of cells, e.g., rotating, flipping (horizontally or vertically), mirroring (horizontally or vertically), or any other known technique may be applied to change the orientation of the cells, until the arrangement of an optimal cell placement is determined 340. That is, method 300 can be used to abut devices with rotation or swap functions to integrate connectivity effectively. In this way, method 300 is used to generate a cell placement with a minimum metal route between the abutted cells. According to aspects of the present disclosure, if a user is not satisfied with the cell placement result, the user can restart the process at operation 305. In some embodiments, determining whether the cell placement and global routing is optimal 335 includes implementing multiple patterning techniques as would be understood by those of ordinary skill in the arts.

In various embodiments, method 300 also includes receiving, from a user, a cell placement priority 345. For example, a user can set a minimum wire-length scheme or a minimum layout area as would be understood by those of ordinary skill in the arts. Lastly, method 300 includes determining whether the cell placement layout meets design requirements 350. When the cell placement layout meets design requirements, the cell placement layout is generated based on the processes and further used to generate a tape-out, i.e., a completed design result, for manufacture. If the cell placement layout does not meet design requirements, method 300 is aborted.

Figure 4:
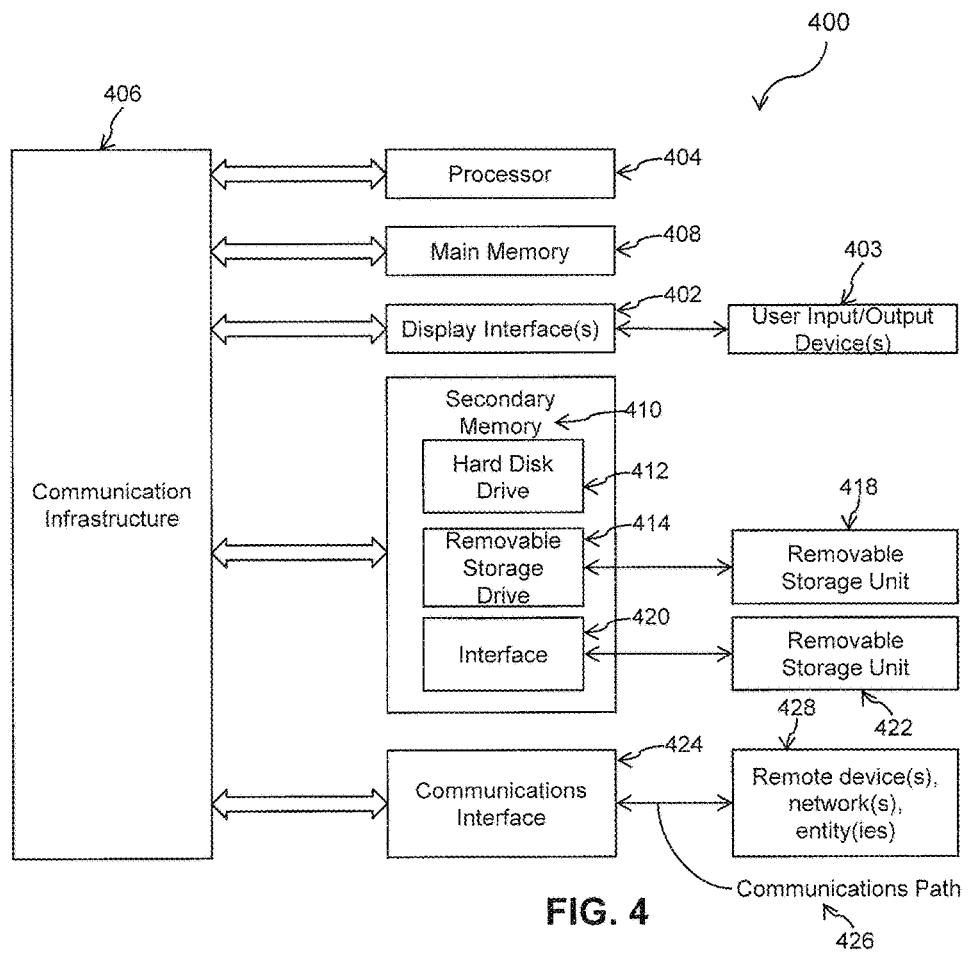
FIG. 4 is an illustration of an exemplary computer system.

Various aspects of the exemplary embodiments may be implemented in software, firmware, hardware, or a combination thereof. FIG. 4 is an high-level block diagram of an exemplary computer system 400 in which embodiments of the present disclosure, or portions thereof, can be implemented as computer-readable code. For example, the processes illustrated by flowcharts 100 and 115' can be implemented in system 400. Various embodiments of this disclosure are described in terms of exemplary computer system 400. After reading this description, it will be apparent to a person skilled in the relevant art how to implement embodiments of this disclosure using other computer systems and/or computer architectures.

It should be noted that the simulation, synthesis and/or manufacture of various embodiments of this disclosure may be accomplished, in part, through the use of computer-readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any computer-readable medium including a semiconductor, magnetic disk, and/or optical disk (such as CD-ROM, DVD-ROM). As such, the code can be transmitted over communication networks including the Internet. The functions accomplished and/or structure provided by the systems and techniques described above can be represented in a memory.

Computer system 400 includes one or more processors, such as processor 404. Processor 404 is connected to a communication infrastructure 406 (e.g., a bus or network).

Computer system 400 also includes a main memory 408, such as random access memory (RAM), and may also include a secondary memory 410. Secondary memory 410 can include, for example, a hard disk drive 412, a removable storage drive 414, and/or a memory stick. Removable storage drive 414 can include a magnetic tape drive, an optical disk drive, a flash memory, or the like. Removable storage drive 414 reads from and/or writes to a removable storage unit 418 in a well-known manner. Removable storage unit 418 can include a floppy disk, magnetic tape, optical disk, flash drive, etc., which is read by and written to by removable storage drive 414. As will be appreciated by persons skilled in the relevant art, removable storage unit 418 includes a computer-readable storage medium having stored therein computer software and/or data. Computer system 400 includes a display interface 402 (which can include input and output devices 403 such as keyboards, mice, etc.) that forwards graphics, text, and other data from communication infrastructure 406 (or from a frame buffer not shown).

In alternative implementations, secondary memory 410 can include other similar devices for allowing computer programs or other instructions to be loaded into computer system 400. Such devices can include, for example, a removable storage unit 422 and an interface 420. Examples of such devices include a program cartridge and cartridge interface (such as those found in video game devices), a removable memory chip (e.g., EPROM or PROM) and associated socket, and other removable storage units 422 and interfaces 420 which allow software and data to be transferred from the removable storage unit 422 to computer system 400.

Computer system 400 can also include a communications interface 424. Communications interface 424 allows software and data to be transferred between computer system 400 and external devices. Communications interface 424 can include a modem, a network interface (such as an Ethernet card), a communications port, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and can be implemented using wire or cable, fiber optics, a phone line, a cellular phone link, a RF link or other communications channels.

In this disclosure, the terms "computer program storage medium" and "computer-readable storage medium" are used to generally refer to non-transitory media such as removable storage unit 418, removable storage unit 422, and a hard disk installed in hard disk drive 412. Computer program storage medium and computer-readable storage medium can also refer to memories, such as main memory 408 and secondary memory 410, which can be semiconductor memories (e.g., DRAMs, etc.). Embodiments of this disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, floppy disks, CD ROMS, tapes, magnetic storage devices, optical storage devices, MEMS, nanotechnological storage devices, etc.).

These computer program products provide software to computer system 400. Embodiments are also directed to computer program products including software stored on any computer-readable storage medium. Such software, when executed in one or more data processing devices, causes a data processing device(s) to operate as described herein.

Computer programs (also called computer control logic) are stored in main memory 408 and/or secondary memory 410. Computer programs may also be received via communications interface 424. Such computer programs, when executed, enable computer system 400 to implement various embodiments as discussed herein. In particular, the computer programs, when executed, enable processor 404 to implement processes of embodiments in accordance of this disclosure, such as the operations in the methods illustrated by flowcharts 100 and 115' of FIGS. 1A and 1B, respectively, can be implemented in system 400. Where embodiments of this disclosure are implemented using software, the software can be stored in a computer program product and loaded into computer system 400 using removable storage drive 414, interface 420, hard drive 412, or communications interface 424.

In various embodiments, a method for cell placement includes placing a plurality of cells selected from a cell library in a chip design to produce a first cell placement, re-placing at least one of the cells from among the plurality of cells until a second cell placement providing a minimum metal route between abutted cells is determined, generating a design layout based on the second cell placement, and outputting the design layout to a machine readable storage medium, wherein the outputted layout is used to manufacture a set of masks used in chip fabrication processes.

In one embodiment, a method for cell placement includes placing a plurality of cells selected from a cell library in a cell-based chip layout to produce a first cell placement and determining whether the first cell placement satisfies design demands. The method also includes rearranging a first cell to abut the first cell with a second cell when the first cell placement fails to satisfy design demands. The first cell is rearranged until a second cell placement providing a minimum metal route between the first and second cells is determined. Furthermore, the method includes generating a cell-based chip layout based on the second cell placement and outputting the design layout to a machine readable storage medium. The outputted layout is used to manufacture a set of masks used in chip fabrication processes.

In a second embodiment, an article of manufacture includes a non-transitory computer readable medium having computer program logic stored thereon that, when executed by a computing device, causes the computing device to perform operations for cell placement. The operations include placing a plurality of cells selected from a cell library in a chip design to produce a first cell placement. The operations also include determining whether the first cell placement satisfies design demands. Furthermore, the operations include rearranging a first cell from among the plurality of cells to abut the first cell with a second cell from among the plurality of cells when the first cell placement fails to satisfy design demands. The first cell is rearranged until a second cell placement providing a minimum metal route between the first and second cells is determined. The operations also include generating a design layout based on the second cell placement and outputting the design layout to a machine readable storage medium. The outputted layout is used to manufacture a set of masks used in chip fabrication processes.

In a third embodiment, a system for generating a cell placement layout includes a memory that stores instructions for generating the cell placement layout and a processor. The processor is configured to place a plurality of cells selected from a cell library in a chip layout to produce a first cell placement. The processor is further configured to determine whether the first cell placement satisfies design demands. Additionally, the processor is configured to rearrange a first cell from among the plurality of cells to abut the first cell with a second cell from among the plurality of cells when the first cell placement fails to satisfy design demands. The first cell is rearranged until a second cell placement providing a minimum metal route between the first and second cells is determined. The processor is also configured to generate a cell-based chip layout based on the second cell placement and output the cell-based chip layout to a machine readable storage medium. The outputted cell-based chip layout is used to manufacture a set of masks used in chip fabrication processes.

Features of several embodiments are outlined so that those skilled in the art may better understand the aspects of the present disclosure. Those skilled in the art should appreciate that they may readily use this disclosure as a basis for designing or modifying other processes and structures for carrying out the same purposes and/or achieving the same advantages of the embodiments introduced herein. Those skilled in the art will realize that such equivalent constructions do not depart from the spirit and scope of this disclosure, and that they may make various changes, substitutions, and alterations herein without departing from the spirit and scope of this disclosure.

What is claimed is:

1. A method for cell placement, the method comprising:
    placing a plurality of cells selected from a cell library in a cell-based chip layout to produce a first cell placement;
    determining whether the first cell placement satisfies design demands;
    rearranging a first cell from among the plurality of cells to abut the first cell with a second cell from among the plurality of cells when the first cell placement fails to satisfy the design demands, wherein the first cell is rearranged until a second cell placement providing a minimum metal route between the first and second cells is determined;
    generating the cell-based chip layout based on the second cell placement; and
    outputting the cell-based chip layout to a machine readable storage medium, wherein the outputted cell-based chip layout is used to manufacture a set of masks used in chip fabrication processes.

2. The method of claim 1, wherein the determining whether the first cell placement satisfies the design demands comprises determining whether a first abutment provides a correct metal routing between the first cell and the second cell.

3. The method of claim 1, wherein the rearranging the first cell comprises at least one of rotating the first cell, flipping the first cell, or mirroring the first cell.

4. The method of claim 1, wherein a first connection target of the first cell is located at a position spaced away from a cell boundary of the first cell and a second connection target of the second cell is located at a position away from a cell boundary of the second cell.

5. The method of claim 4, wherein the rearranging the first cell comprises rearranging the first cell to minimize a wire length between the first connection target and the second connection target.

6. The method of claim 1, further comprising:
    determining whether the second cell placement satisfies the design demands; and
    performing an auto-abutment to generate a third cell placement when the second cell placement fails to satisfy the design demands.

7. The method of claim 6, wherein the auto-abutment comprises removing existing metal layers and broadening metal usage on each layer.

8. An article of manufacture comprising a non-transitory computer readable medium having computer program logic stored thereon that, when executed by a computing device, causes the computing device to perform operations for cell placement, the operations comprising:
    placing a plurality of cells selected from a cell library in a chip design to produce a first cell placement;
    determining whether the first cell placement satisfies design demands;
    rearranging a first cell from among the plurality of cells to abut the first cell with a second cell from among the plurality of cells when the first cell placement fails to satisfy the design demands, wherein the first cell is rearranged until a second cell placement providing a minimum metal route between the first and second cells is determined;
    generating a design layout based on the second cell placement; and
    outputting the design layout to a machine readable storage medium, wherein the outputted design layout is used to manufacture a set of masks used in chip fabrication processes.

9. The article of manufacture of claim 8, wherein the determining whether the first cell placement satisfies the design demands comprises determining whether a first abutment provides a correct metal routing between the first cell and the second cell.

10. The article of manufacture of claim 8, wherein the rearranging the first cell comprises at least one of rotating the first cell, flipping the first cell, or mirroring the first cell.

11. The article of manufacture of claim 8, wherein a first connection target of the first cell is located at a position spaced away from a cell boundary of the first cell and a second connection target of the second cell is located at a position away from a cell boundary of the second cell.

12. The article of manufacture of claim 11, wherein the rearranging the first cell comprises rearranging the first cell to minimize a wire length between the first connection target and the second connection target.

13. The article of manufacture of claim 8, the operations further comprising:
    determining whether the second cell placement satisfies the design demands; and
    performing an auto-abutment to generate a third cell placement when the second cell placement fails to satisfy the design demands.

14. The article of manufacture of claim 13, wherein the auto-abutment comprises removing existing metal layers and broadening metal usage on each layer.

15. A system for generating a cell placement layout, the system comprising:
- a memory that stores instructions for generating the cell placement layout;
- a processor configured to:
  - place a plurality of cells selected from a cell library in a chip design to produce a first cell placement;
  - determine whether the first cell placement satisfies design demands;
  - rearrange a first cell from among the plurality of cells to abut the first cell with a second cell from among the plurality of cells when the first cell placement fails to satisfy the design demands, wherein the first cell is rearranged until a second cell placement providing a minimum metal route between the first and second cells is determined;
  - generate a design layout based on the second cell placement; and
  - output the design layout to a machine readable storage medium, wherein the outputted design layout is used to manufacture a set of masks used in chip fabrication processes.

16. The system of claim 15, wherein the processor is further configured to determine whether a first abutment provides a correct metal routing between the first cell and the second cell.

17. The system of claim 15, wherein the processor is further configured to at least rotate the first cell, flip the first cell, or mirror the first cell.

18. The system of claim 15, wherein a first connection target of the first cell is located at a position spaced away from a cell boundary of the first cell and a second connection target of the second cell is located at a position within and spaced away from a cell boundary of the second cell.

19. The system of claim 18, wherein the processor is further configured to rearrange the first cell to minimize a wire length between the first connection target and the second connection target.

20. The system of claim 15, wherein the processor is further configured to:
- determine whether the second cell placement satisfies the design demands; and
- perform an auto-abutment to generate a third cell placement when the second cell placement fails to satisfy the design demands, the auto-abutment comprising removing existing metal layers and broadening metal usage on each layer.

* * * * *